Oct. 30, 1951  F. A. HOWARD, JR  2,573,570
ACCOUNTING AID
Filed July 20, 1946  3 Sheets-Sheet 1
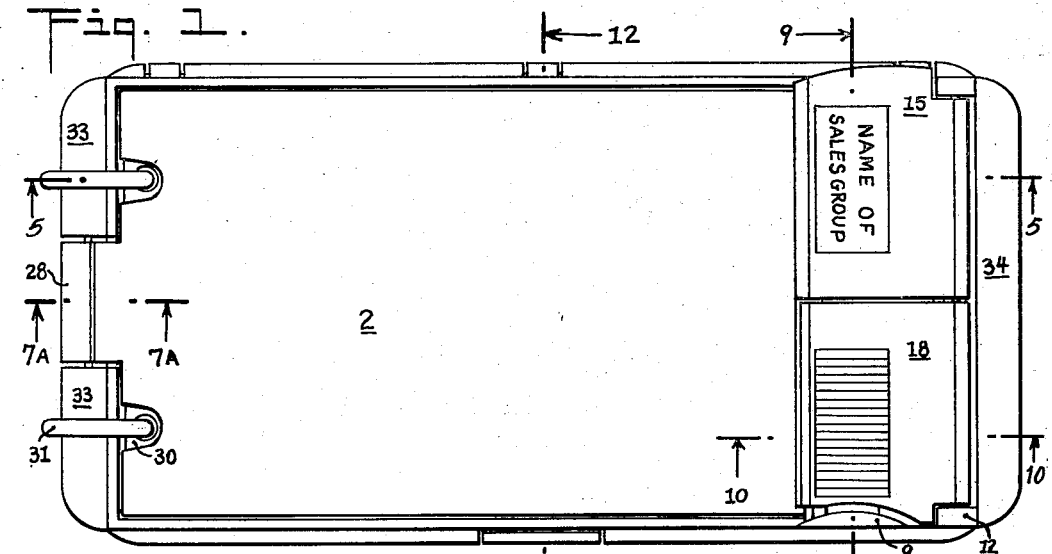
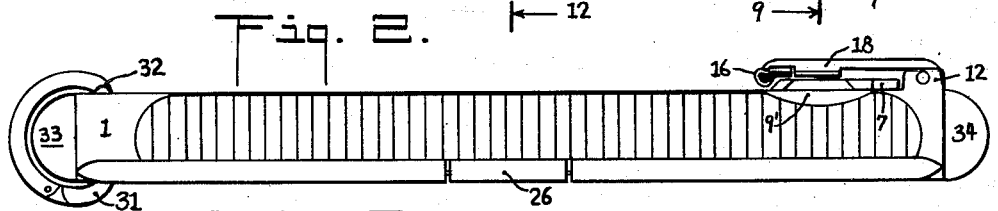
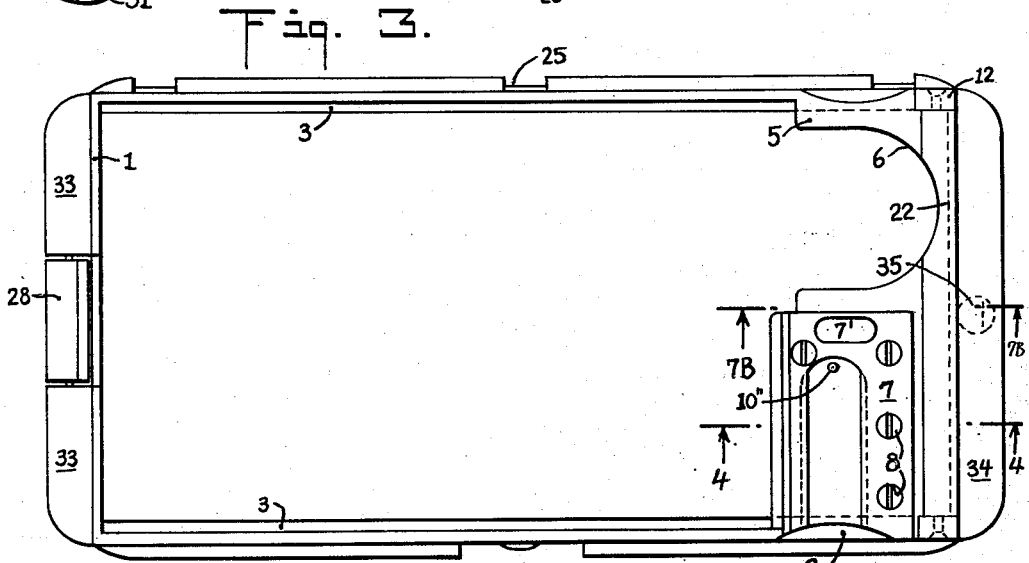
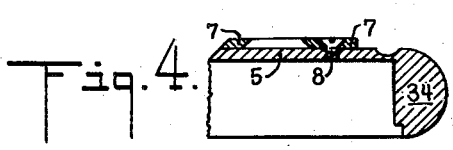
INVENTOR.
FRANK A. HOWARD, JR.
BY Kenyon & Kenyon
ATTORNEYS Oct. 30, 1951   F. A. HOWARD, JR   2,573,570
ACCOUNTING AID
Filed July 20, 1946   3 Sheets-Sheet 2
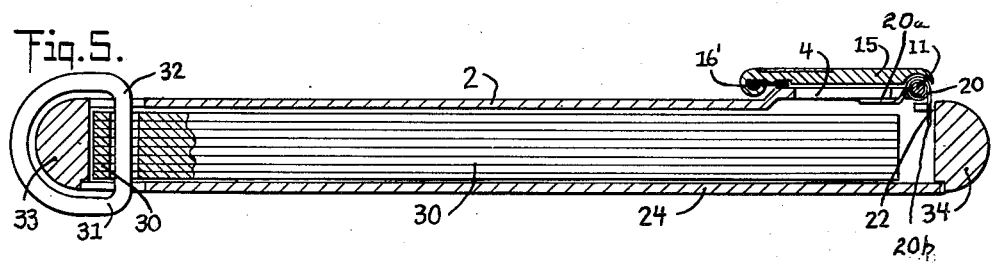
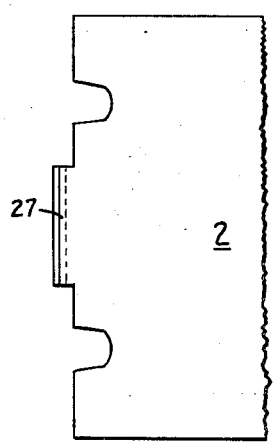
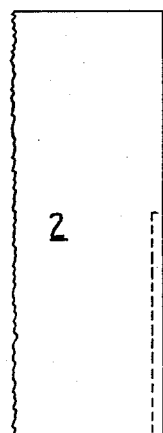
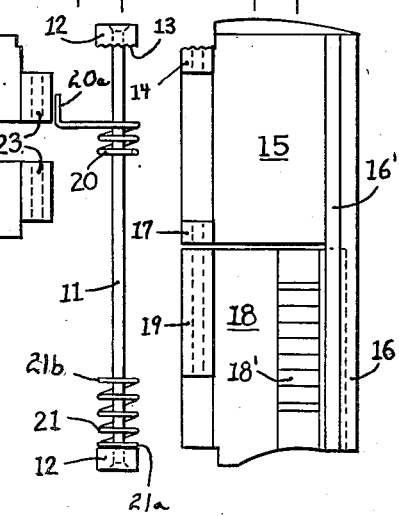
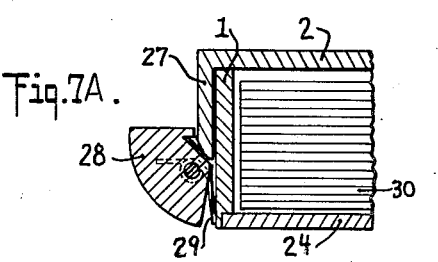
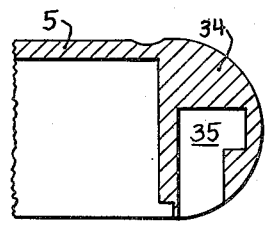
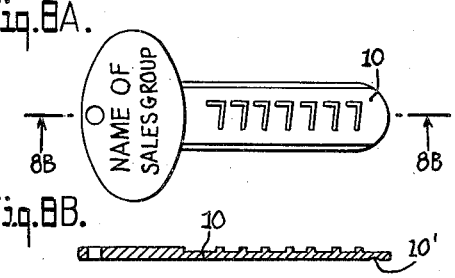
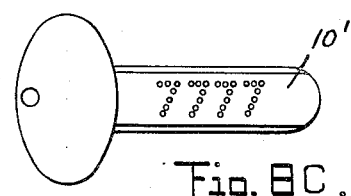
INVENTOR.
FRANK A. HOWARD, JR.
BY Kenyon & Kenyon
ATTORNEYS Oct. 30, 1951     F. A. HOWARD, JR     2,573,570
ACCOUNTING AID
Filed July 20, 1946     3 Sheets-Sheet 3
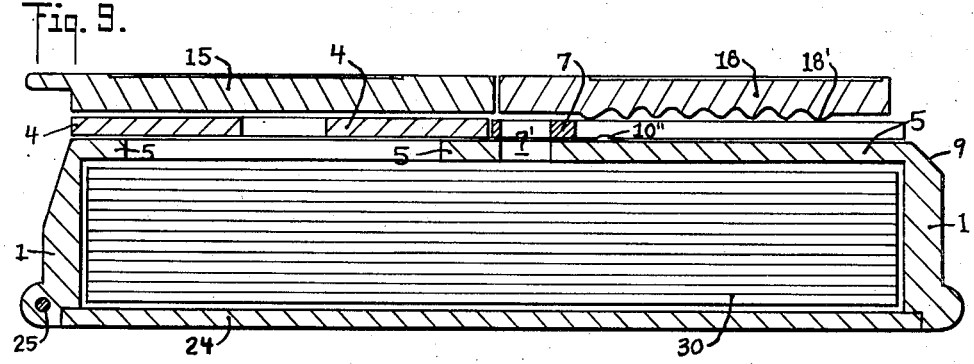
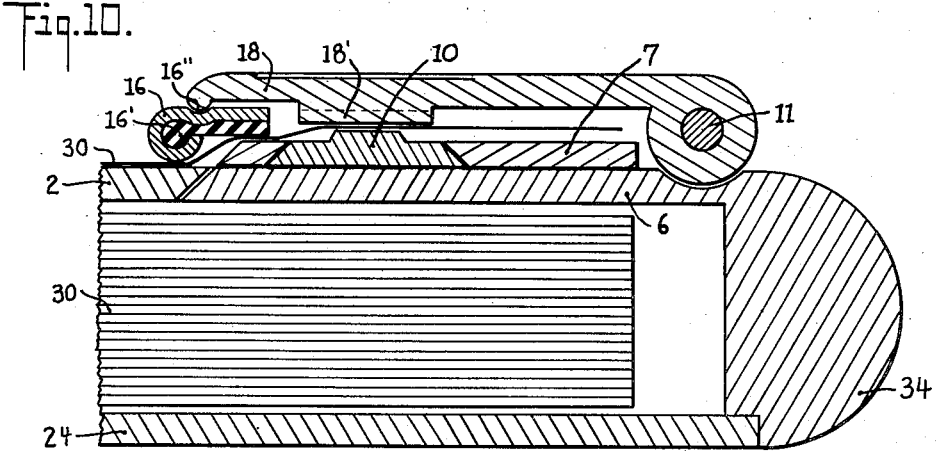
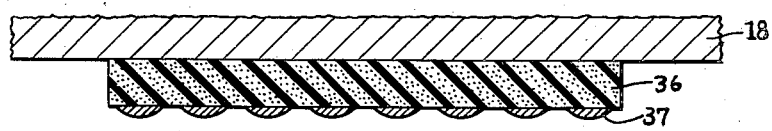
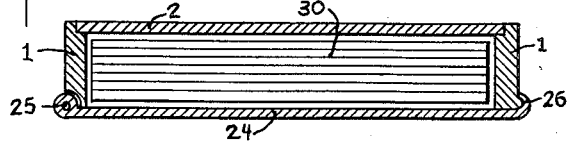
INVENTOR.
FRANK A. HOWARD, JR.
BY
Kenyon & Kenyon
ATTORNEYS Patented Oct. 30, 1951

2,573,570

UNITED STATES PATENT OFFICE 2,573,570

ACCOUNTING AID

Frank A. Howard, Jr., Elizabeth, N. J.

Application July 20, 1946, Serial No. 685,030

7 Claims. (Cl. 101—297)

My invention relates to improvements in accounting aids and will be fully understood from the following description taken in connection with the accompanying drawings.

In these drawings, Figure 1 is a top plan view of a case embodying the invention.

Figure 2 is a side elevation of the same.

Figure 3 is a top plan view of the frame of the case.

Figure 4 is a transverse fragmentary longitudinal section on the line 4 of Figure 3.

Figure 5 is a longitudinal section on the line 5—5 of Figure 1.

Figure 6a is a fragmentary top plan view of the free end of the hinged top lid of the case.

Figure 6b is a fragmentary top plan view of the hinged end.

Figure 6c is a plan view of the hinge pin showing it mounted on the end supports.

Figure 6d is a bottom plan view of the twin end flaps which are also carried by the hinge pin shown in Figure 6c.

Figure 7a is a fragmentary longitudinal section of the lower end of the case on the line 7a of Figure 1.

Figure 7b is a fragmentary longitudinal section on the line 7b of Figure 3.

Figure 8a is a plan view of a key-type identification and printing device for use in the case shown in the preceding figures.

Figure 8b is a section on the line 8b of Figure 8a.

Figure 8c is a plan view of a modified key type identification.

Figure 9 is an enlarged transverse section through the complete case on the line 9—9 of Figure 1.

Figure 10 is an enlarged fragmentary longitudinal section through the upper end of the case taken through the line 10 of Figure 1 and including identification key and accounting slip.

Figure 11 is an enlarged fragmentary cross section through an alternate type platen.

Figure 12 is a transverse section through the case on the line 12—12 of Figure 1.

The accounting aid of my present invention is especially designed for use in connection with the key-type of customer's identification and printing device shown and described in my co-pending applications, Serial Nos. 645,868 and 655,980 (the latter now abandoned). This application is a continuation in part of both said applications.

In general the accounting aid of the present invention comprises a convenient form of case for sales slips and the like and a novel means for printing upon such slips from a customer's identification device, the whole constituting an accounting aid especially suitable for making duplicate records of sales and deliveries made on credit to authorized customers.

Referring more particularly to the drawings, the numeral 1 designates the frame of a shallow rectangular case. The numeral 2 designates the top lid for this case which in the closed position rests on shoulders 3 on the side rails of the frame. The lid 2 is carried by arm portions 4 which are offset above the plane of the lid as shown most clearly in Figure 5 to lie above the stationary cover 5, which lies across one end of the frame 1 as shown in Figure 3. On one side the stationary cover 5 is cut away in the form of a finger hole as shown at 6. The other end of the stationary cover serves as a base for the key receiver 7. This key receiver is in the form of a plate secured to the stationary member 5 by screws 8. The key slot in the receiver 7 opens on the side of the case in a bevelled arcuate depression 9 to guide the end of the key and receive the key head. The key slot has undercut side walls as shown most clearly in the enlarged cross section in Figure 10 and by means of these undercut side walls, a key of the form shown in Figures 8a and 8b may be held in place when inserted lengthwise in the key slot. The key is shown in position in Figure 10 and is there designated by the numeral 10. This key also may have the form shown in Fig. 8c derived from Figs. 21 and 22 of my copending application Serial No. 645,868. In Fig. 8c therein the raised identifying characters are not formed by continuous lines but by a series of projections having a very small area in the form of dots. By this means, the total area necessary to form a series of legible characters by printing, etc., is greatly reduced so that with a given amount of pressure the printing of carbon reproductions are improved. With such form of key, the strip 10′ bearing the characters as outlining dot projections is preferably soldered or cemented to the key blank so that the solder (a cement) itself fills the space below the embossed projections to convert the key in effect to a solid structure of maximum strength and rigidity.

To cooperate with a key inserted in the slot of the receiver 7, there is provided a printing platen which is carried by one of the two end flaps of the case. These end flaps may be conveniently mounted on the same hinge pin designated 11 which carries the supporting arms 4 for the top lid 2 of the case. The hinge pin 11, as shown in Figure 6c, is carried in supporting ears 12 mounted on the frame 1. The inner face of one of the supporting ears is roughened by radial corrugations as shown at 13, Figure 6c. Matching corrugations are formed in the end face of the end hinge member 14 on the main end flap 15. This main end flap carries an integral arm 16 which extends across the width of the case and forms a hold-down member and tearing edge for the accounting slips as will later appear. The main section of the end flap 15 is only one-half the width of the case, terminating at the inner hinge member 17. The other twin end flap designated 18 carries an integral hinge member 19, and an integral platen 18'.

The hinge assembly is completed by a small torsion spring 20 and a relatively long compression spring 21, which are mounted on the hinge pin 11 in the positions shown in Figure 6c. The torsion spring 20 has one projecting end 20a arranged to underlie an arm 4 of the lid 2 and the other projecting end locked by passing through a hole 22 in the top of the case as shown in Figures 3 and 5. One end 21a of the compression spring 21 rests against the other supporting ear 12 on the case 1 as its abutment and bears at the other end 21b against the hinge member 19 of the end flap 18. As shown in Figures 6b, 6c and 6d, the hinge pin 11 and the various hinge members carried by the arms 4 and by the two end flaps 15 and 18 make up a composite piano-type hinge. The torsion spring 20 lies between the hinge members 23 of the arms 4 and exerts a pressure tending to raise the cover 2 and hold it in an elevated position, also transversely locking the cover 2 and main end flap 15. The compression spring 21 bears against the end of the hinge member 19 and exerts longitudinal pressure against the entire hinge assembly, causing the hinge member 14 to engage the serrated surface of the stationary hinge pin support 12. When in its normal closed position as shown in Figure 10, the flap 18 rests upon the arm 16. The lower face of arm 16 grips a rubber strip 16', which bears upon the accounting slip 30' as will later appear. The upper face of arms 16 is grooved at 16" to receive a tongue formed on the lower edge of the flap 18 as shown in Figure 10. The operation of these parts will be later described.

The case formed by the rectangular frame 1 and the top cover 2 is completed by a bottom cover 24 hinged along one side edge of the frame 1 by hinge pin 25 and is normally held in a closed position by a friction clasp 26. The top cover 2 is also normally held in a closed position by a clasp shown in detail in Figure 7a and comprising a bent section 27 overlying the end of the case and engaged by a pivoted catch 28, yieldingly held in locking position by a spring 29.

The case formed by the members previously described is intended to hold a supply of accounting slips which may consist of separate slips or may consist of units made up of a plurality of slips with carbon backs or interleaved carbon papers. For the purposes of this invention I prefer to fasten these slips in the case by means of ring binder construction. The book of slips 30 has two perforations near one end through which are passed D shaped binder rings designated 31. The binder rings are preferably hinged for convenience in replacing the books, the ends meeting as shown at 32. To retain the binder rings and the book of slips in position within the case, the outer end of the frame 1 carries rounded projections as shown at 33 and by reference to Figures 1, 2 and 5, it will be seen that these projections 33, while providing some clearance within the binder rings 31, hold these rings substantially in the same position at all times. The top cover 2 and the bottom cover 24 are appropriately notched to clear the binder rings in opening and closing. For the sake of symmetry, the upper end of the frame 1 may have a rounded projection 34 matching the projections 33 which center the binder rings. This projection 34 may have a cavity 35 as shown in Figure 7b so that the case may be conveniently hung on a nail. In Figure 9 the integral platen 18' on the bottom face of the flap 18 is shown as made up of a series of transverse corrugations. In Figure 10 the length of these corrugations is shown as approximately the same as the width of the key 10 which forms the printing member. In Figure 11 there is shown an alternative construction of the platen. Here the contact surface is made up of a series of slightly spaced parallel bars, having rounded contours. The bars 37 may be vulcanized to the lower face of a cushion 36 of moderately soft rubber vulcanized to the lower face of the flap 18.

The utility of the construction described will best be understood by a description of a typical method of employing this accounting aid. Assuming that the case contains a booklet of accounting slips 30 mounted on the ring binders and that the parts are all in the position shown in Figure 1, it will be seen that the device as a whole comprises a convenient carrying case of smooth outlines, readily carried in a clothing pocket, or conveniently hung on a nail or like support. The lower side edges of the frame may be beaded as shown best in Figure 9 to facilitate handling of the case, and the sides above the beads may be roughened as shown in Figure 2.

To record an accounting transaction, the first operation is to insert the customer's identification key in the key receiver 7. This is done by entering the end of the key blade in the arcuate depression and sliding the key into place by longitudinal pressure. This action is visible, and further facilitated by the arcuate bevel guide 9 of the frame 1. When inserted, the key may be frictionally locked in place by a depression 10' in its lower face, which may engage a projection 10" in the floor of the key slot. The construction is such that the key may be inserted while still carried by any key ring or key holder of ordinary construction. The next operation is to release the catch 28, which permits the torsion spring 20 to lift the cover 2. In its upward motion the cover also lifts the end flap 15 and the latter in turn lifts the end flap 18 so that all three of the hinged members move up together to expose to view the top accounting sheet 30. This sheet may be conveniently reached through the finger hole 6 in the stationary end section 5 of the case and turned back on the binder rings 31 as pivots. The next operation is to close the cover 2 manually. The two end flaps 15 and 18 will still remain in the elevated position, however, because of the pressure of the compression spring 21 holding in engagement the serrated faces of the hinge members 12 and 14. The accounting slip may therefore be laid over the cover 2 and its upper end will also extend across the arms 4 and the key receiver 7.

The next operation is to manually close the end flaps 15 and 18. With the parts in this position, the necessary entries may be made with pen or pencil on the exposed accounting slip which now lies on the cover 2 and, assuming that there be used interleaved carbons or carbon backs, any number of duplicate copies of this accounting record may thus be made. In order to complete the accounting record, the hinged end flap 18 is now firmly pressed downward against the accounting slip by thumb pressure applied on the roughened top surface of the flap 18 directly above the platen, and the corrugated platen member designated 18' carried by the flap 18 presses the accounting slip against the printing characters carried on the upper face of the customer's identification key. At the same time the tongue on the outer end of the flap 18 bears against the groove 16" in the arm 16 carried by the companion flap 15. To firmly press this arm against the surface of the accounting slip, the inserted rubber strip designated 16', most clearly shown in Figures 6d and 10, forms the actual contact between the arm 16 and the upper face of the accounting slip. By this construction the paper is firmly gripped and held against slipping and at the same time the necessity of extreme accuracy in the parts is avoided. While the corrugated platen is held firmly against the paper by manual pressure, it may be moved slightly to and fro by sliding along the hinge pin 11 against the resistance of the compression spring 21, and by a very slight sliding motion of this kind the smooth contours of the surfaces forming the corrugated platen face are brought into contact with the entire surface of the paper. By this combination of pressure and short sliding action, it is possible to produce good legible impressions on a large number of copies with relatively light manual pressure on the flap 18. I am thus able to avoid the use of heavy platen parts and lever and cam devices for magnifying the pressure effect, using instead simple and direct manual pressure.

In Figure 11 the contact surface of the platen is formed by the series of bars 37 each of which is free to move inwardly by compression of the rubber cushion 36. This construction permits the platen to accommodate itself to bent or twisted keys 10, both on the initial impression made by pressing the platen against the sheet, and on the completion of this initial impression by the sliding of the platen.

When the identifying characters on the customer's identification key have been printed, or if no carbon surfaces are used, then merely embossed on the end of the accounting slip by the procedure described, the transaction may be completed in a variety of ways depending upon the result desired. For example, where multiple slips are used in a single pre-fabricated unit, the top copy may be torn off along the tearing edge of the arm 16. This copy containing all of the information which has been entered upon the slip, save the printed or embossed identifying characters of the customer's key, is suitable as a customer's receipt. All of the accounting slips may be easily separated by manually raising the flap 15 which in turn raises the platen flap 18 and stripping the accounting slips loose from the binder rings 31. Or, if desired, all of the slips or any number of them, if multiple units are employed, may be stored in the case by the following procedure. The lower cover 24 is opened and the slips are then turned around through 360° on the binder rings 31 until they lie on the bottom of the pile or book 30, after which the lower cover 24 is again closed.

The customer's identification key 10 may be removed and returned to him at any time after the accounting record has been made. After the return of the key, the parts are again in the normal position as shown in Figure 1. In this position it is possible to inspect the interior of the case at any time to determine approximately how many accounting slips it still contains merely by sliding the platen flap 18 outward until it exposes a small window 7' in the key receiver 7 and stationary end section 6 which it overlies.

The accounting aid as shown and described is most especially useful in connection with the recording of sales of oil products at filling stations where it is desirable to have a simple portable carrier for charge slips, capable also of forming a temporary storage reservoir for used slips and susceptible of readily cooperating with charge customers' identification devices, as for example the key device shown.

I claim:

1. An accounting mechanism comprising a shallow substantially rectangular frame, a base mounted in said frame, printing type removably mounted on said base, a movable printing platen hingedly carried by the base and adapted to press a sheet against the face of the type, said platen having a roughened contact surface of which protruding portions have rounded boundary contours lying in a plane parallel with the type face, means carried by the frame for slidably guiding said platen in a limited motion parallel to the type face, whereby the platen surfaces in contact with the sheet may slide over the face thereof while pressing the sheet against the type face to produce a legible impression on the sheet with a minimum of direct pressure, a top cover for the frame hingedly supported adjacent one end of the frame for rotation on a hinge axis substantially parallel to said one end of the frame, a bottom cover for the frame hingedly supported adjacent one side of the frame for rotation on a hinge axis substantially parallel to said side of said frame, binder rings embracing the other end of said frame and providing clearance between the latter end and said rings, and a book of sheets supported in said frame on said rings, said covers each having clearances to permit opening thereof independently without removal of said rings and the clearance between said rings and their supporting end of said frame permitting the sheets to be rotated on the rings from the top to the bottom of said book of sheets without removal from said rings when the top and bottom covers are moved to open positions on their hinge supports.

2. A mechanism in accordance with claim 1 in which the protruding portions of the platen surfaces are formed by a plurality of parallel corrugations having rounded boundary contours and are disposed at an angle to the direction of slide of the platen.

3. A mechanism in accordance with claim 1 in which the platen surface is formed by a multiplicity of independent members yieldingly secured to the platen to accommodate themselves to unevenness in the surfaces of the type face.

4. A mechanism in accordance with claim 1 in which the platen surfaces are formed by a plurality of parallel bars of rounded outer contours, said bars being mounted in a common rubber base secured to the platen and disposed substantially transversely of the platen with respect to its direction of slide.

5. A mechanism according to claim 1 including a removable member which serves as a customer's identification device and on which said type is mounted.

6. A mechanism according to claim 1 in which said platen is hingedly carried by the frame adjacent said one end of said frame which supports said top cover, and a common hinge pin for hingedly supporting both said platen and said top cover adjacent said one end of said frame.

7. An accounting mechanism comprising a shallow frame, a base mounted in said frame, printing type removably mounted on said base, a movable printing platen hingedly carried relative to the base and adapted to squeeze a sheet against individual faces of the type, said platen having an irregular contact surface of which protruding portions have rounded boundary contours lying in a plane parallel with the type face, means for slidably guiding said platen in a limited motion parallel to the type face, whereby the platen surfaces in contact with the sheet may slide over the face thereof while squeezing the sheet against individual type faces to produce a legible impression on the sheet with a minimum of direct pressure, a top cover for the frame hingedly supported adjacent one end of the frame for rotation on a hinge axis substantially parallel with said one end of said frame, a bottom cover for the frame hingedly supported adjacent one side of the frame for rotation on a hinge axis substantially parallel to said side of said frame, binder rings at the other end of said frame providing clearance between the latter end and said rings, a book of sheets supported in said frame on said rings, said covers each having clearances to permit opening thereof independently without removal of said rings and the clearance between the rings and said other end of said frame permitting the sheets to be rotated on the rings from the top to the bottom of said book of sheets without removal from said rings when the top and bottom covers are in open positions on their hinge supports.

FRANK A. HOWARD, Jr.

REFERENCES CITED

The following references are of record in the file of this patent:

UNITED STATES PATENTS

| Number | Name | Date |
|---|---|---|
| Re. 16,977 | Anthony | May 29, 1928 |
| 364,918 | Greenleaf | June 14, 1887 |
| 655,876 | Kearney | Aug. 14, 1900 |
| 1,133,459 | Carrier | Mar. 30, 1915 |
| 1,277,119 | Quigley | Aug. 27, 1918 |
| 1,278,041 | Sherwood | Sept. 3, 1918 |
| 1,736,409 | Lawrence | Nov. 19, 1929 |
| 1,769,028 | Johnson | July 1, 1930 |
| 1,801,592 | Dugdale | Apr. 21, 1931 |
| 1,842,907 | Lawhorn | Jan. 26, 1932 |
| 1,865,071 | Anderson | June 28, 1932 |
| 1,866,997 | Bryce | July 12, 1932 |
| 1,987,379 | Taylor | Jan. 8, 1935 |
| 2,092,026 | Schaefer | Sept. 7, 1937 |
| 2,102,787 | Christenson | Dec. 21, 1937 |
| 2,149,052 | Heller | Feb. 28, 1939 |
| 2,209,520 | Hamrick | July 30, 1940 |
| 2,281,577 | Haynes | May 5, 1942 |

FOREIGN PATENTS

| Number | Country | Date |
|---|---|---|
| 395,656 | Great Britain | July 20, 1933 |